US011951848B2

(12) United States Patent
Curran et al.

(10) Patent No.: US 11,951,848 B2
(45) Date of Patent: Apr. 9, 2024

(54) POWER TRANSFER DEVICE AND MOORING AREA FOR INDUCTIVELY CHARGING A WATER-BOUND VEHICLE

(71) Applicant: Bombardier Primove GmbH, Berlin (DE)

(72) Inventors: Éanna Curran, Darmstadt (DE); Sergio Alejandro Perez Romero, Alsbach-Hähnlein (DE)

(73) Assignee: Bombardier Primove GmbH, Berlin (DE)

( * ) Notice: Subject to any disclaimer, the term of this patent is extended or adjusted under 35 U.S.C. 154(b) by 421 days.

(21) Appl. No.: 17/296,452

(22) PCT Filed: Dec. 3, 2019

(86) PCT No.: PCT/EP2019/083453
§ 371 (c)(1),
(2) Date: May 24, 2021

(87) PCT Pub. No.: WO2020/115030
PCT Pub. Date: Jun. 11, 2020

(65) Prior Publication Data
US 2021/0394625 A1    Dec. 23, 2021

(30) Foreign Application Priority Data
Dec. 3, 2018   (GB) .................................... 1819708

(51) Int. Cl.
*H02J 50/10*   (2016.01)
*B60L 53/12*   (2019.01)
(Continued)

(52) U.S. Cl.
CPC ............... *B60L 53/12* (2019.02); *B60L 53/38* (2019.02); *H02J 7/0042* (2013.01);
(Continued)

(58) Field of Classification Search
CPC ...... B60L 53/12; B60L 53/38; B60L 2200/32; B60L 53/30; H02J 7/0042; H02J 50/005;
(Continued)

(56) References Cited

U.S. PATENT DOCUMENTS 10,059,419 B2 *   8/2018   Glueckhardt ........... B60L 53/00
10,230,243 B2 *   3/2019   Schatz ..................... H03H 7/40
(Continued)

FOREIGN PATENT DOCUMENTS

GB   2054093 A  *  2/1981  .......... E02B 17/003
GB   2458476 A  *  9/2009  ......... E21B 33/0385
(Continued)

OTHER PUBLICATIONS

International Search Report and Written Opinion dated Feb. 24, 2020, in connection with PCT/EP2019/083453 filed Dec. 3, 2019.
(Continued)

*Primary Examiner* — M Baye Diao
(74) *Attorney, Agent, or Firm* — Downs Rachlin Martin PLLC (57) ABSTRACT

The invention relates to power transfer device for inductively charging a water-bound vehicle, comprising: a power transfer part comprising a primary conductor arrangement; and at least one connecting member which has a first connecting portion for connecting the power transfer device to the surroundings and a second connecting portion for connecting the connecting member to the power transfer part; wherein the connecting member has a least one resilient portion that is configured to absorb shocks exerted onto the power transfer part. Further, the invention relates to a mooring area, comprising a respective power transfer device.

11 Claims, 3 Drawing Sheets

(51) Int. Cl.
*B60L 53/38* (2019.01)
*H02J 7/00* (2006.01)
*H02J 50/00* (2016.01)
*H02J 50/60* (2016.01)

(52) U.S. Cl.
CPC ............ *H02J 50/005* (2020.01); *H02J 50/10* (2016.02); *H02J 50/60* (2016.02); *B60L 2200/32* (2013.01)

(58) Field of Classification Search
CPC . H02J 50/10; H02J 50/60; H02J 50/40; Y02T 10/70; Y02T 10/7072; Y02T 90/12; Y02T 90/14
USPC .......................................................... 320/108
See application file for complete search history.

(56) References Cited

U.S. PATENT DOCUMENTS

| 2010/0272517 | A1 | 10/2010 | Montgomery |
| 2014/0375140 | A1 | 12/2014 | Niizuma |
| 2017/0077759 | A1 | 3/2017 | Niizuma |

FOREIGN PATENT DOCUMENTS

| GB | 2508923 A | | 6/2014 | |
| GB | 2508923 A | * | 6/2014 | ............ B60L 11/182 |
| GB | 2512864 A | | 10/2014 | |
| GB | 2512864 A | * | 10/2014 | ............ B60L 11/182 |
| GB | 2517679 A | | 3/2015 | |
| JP | H09102329 A | | 4/1997 | |
| JP | 2004022779 A | | 1/2004 | |
| JP | 2010011696 A | | 1/2010 | |
| JP | 2010011696 A | * | 1/2010 | ............ B60L 53/12 |
| KR | 101596923 A | | 2/2016 | |
| WO | WO-2013154131 A1 | * | 10/2013 | ............ B60L 53/12 |
| WO | 2016140239 A1 | | 9/2016 | |
| WO | WO-2016140239 A1 | * | 9/2016 | ................ B63J 3/04 |
| WO | 2017125153 A1 | | 7/2017 | |

OTHER PUBLICATIONS

Search Report dated May 28, 2019, in connection with GB1819708.7 filed Dec. 3, 2018.

* cited by examiner

POWER TRANSFER DEVICE AND MOORING AREA FOR INDUCTIVELY CHARGING A WATER-BOUND VEHICLE

The invention relates to a power transfer device and mooring area for inductively charging a water-bound vehicle. Preferably, the vehicle is electrically propelled or, in other words, electrically driven and the inductive charging is used for providing electric energy that is usable for electrically propelling said vehicle. The transferred electric energy may (additionally or alternatively) also be used for different purposes other than propulsion, such as for operating onboard electrical systems of the vehicle.

Electric vehicles, in particular a water-bound vehicles such as boats, ships or marine vessels, can be propelled by electric energy which is generally transferrable by means of an inductive power transfer. The vehicle may comprise a circuit arrangement which can be a propulsion system or a part of a propulsion system of the vehicle, comprising a receiving device adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a battery or to operate an electric machine. In the latter case, the DC can be converted into an AC by means of an inverter.

Typically, the inductive power transfer is performed by using sets of e.g. three-phase primary conductor arrangements which may each be formed into windings or generally into specific shapes, courses or paths of electric conductors. A first set is installed in the surroundings (primary conductor arrangement) and may be fed by a so-called wayside power converter (WPC). The primary conductor arrangements and/or the wayside power converter may be part of a so-called primary unit which typically remains in a stationary position (but may comprise movable parts). The second set (i.e. secondary conductor arrangement) may be installed on the vehicle. The secondary conductor arrangement or, generally, the secondary side is often referred to as a pick-up-arrangement or receiver. The first primary conductor arrangement and the secondary conductor arrangement form a high frequency transformer to transfer electric energy to the vehicle. This can be done in a static state when there is no movement of the vehicle by way of its propulsion system or in a dynamic (i.e. moving) state.

There exist a number of solutions for the inductive electric charging of road- or track-bound vehicles with help of respective primary conductor arrangements. In these cases, it is reasonable to assume that the relative position of a vehicle (e.g. a specific car, train or truck model) and the power transfer device will substantially remain constant during the inductive power transfer. Also, when arranging the vehicle at the power transfer device, it can be assumed that shocks or collisions between the power transfer device and the vehicle can be avoided, e.g. by carefully moving a power transfer unit of said device relative to the vehicle.

For water-bound vehicles (e.g. ships or boats), such assumptions only hold under specific circumstances. For example, this would require a body of water on which the vehicle floats to remain calm throughout the inductive charging (e.g. by being free of waves or currents). Moreover, this would require that the vehicle can precisely be controlled and moved relatively to the power transfer device, which may be difficult to achieve in case of floating water-bound vehicles. In consequence, solutions for the inductive charging of road or track-bound vehicles may turn out to be inefficient or even non-usable for water-bound vehicles.

WO 2017/125153 A1 discloses an inductive charging device for marine applications having a power transfer device that is movable relative to e.g. a ship by means of a retractable working arm. A height of the working arm (e.g. for responding to different water levels) may be adjusted by changing a length of the retractable arm and/or by means of separate hydraulic or pneumatic cylinders. Overall, the resulting structure is rather complex, difficult to operate and space-inefficient. Also, due to the complexity and size, a desired reliability may be difficult to achieve and the costs will be high.

It is an object of the invention to provide an inductive power transfer device and a mooring area comprising the same which allow for a reliable inductive power transfer to water-bound vehicles, while maintaining a cost—as well as space-efficient structure.

This object is solved by a device and a mooring area according to the attached independent claims. Advantageous embodiments are defined in the dependent claims. Moreover, the features mentioned in the introductory part of this description may individually or in any combination thereof also be provided in the presently disclosed solution, if not mentioned or evident otherwise.

The invention generally suggests to arrange a power transfer part comprising a primary conductor arrangement at an at least partially resilient connecting member, the latter allowing for a connection to e.g. a mooring area. This way, a defined elastic deformability and/or resilience may be provided which e.g. allows to absorb shocks or pressures exerted onto the power transfer part in case the vehicle comes into contact therewith. Moreover, the power transfer device according to the invention may generally be free of actuatable moving parts (e.g. free of controllably movable kinematic units, driven units and/or actuators). Due to the absence of such parts, the need for working fluids such as hydraulic or lubricant oil can be reduced or even eliminated, thus limiting the risk of pollution due to spilling. Also, the complexity and the costs can be reduced and the reliability can be increased. In general, the invention provides a space-efficient power transfer device which, in particular, may be designed with limited horizontal dimensions. The suggested device is also easy to retrofit to existing mooring areas and/or fenders and generally requires little or no specific installations at the mooring area, such as spacious foundations or the like.

Specifically, a power transfer device for inductively charging a water-bound vehicle is suggested, comprising:
- a power transfer part comprising a primary conductor arrangement; and
- at least one connecting member which has a first connecting portion for connecting the power transfer device (in particular the connecting member) to the surroundings and a second connecting portion for connecting the connecting member to the power transfer part;

wherein the connecting member has a least one resilient portion that is configured (e.g. sized, shaped and/or in terms of the used material) to absorb shocks exerted onto the power transfer part.

The vehicle, which may e.g. be a ship, boat or marine vessel, may be water-bound at least during the inductive power transfer. The transferred electrical energy may be usable for an electric propulsion system of the vehicle which may e.g. comprises a rotatable propeller or a pump-jet.

Additionally or alternatively, the energy may be usable for onboard electric systems of the vehicle, other than a propulsion system.

The body of water on which the vehicle floats may be marked by substantially constant water levels (e.g. over longer time periods of several days) or, differently put, by non-tidal water levels. The power transfer device may generally be free of any kinematic members and especially driven or controllable kinematic members which would e.g. allow for a defined movement and in particular a substantial displacement of the components of the power transfer device such as the power transfer part. The power transfer part may be generally stationary and/or held in a substantially constant position and/or orientation by means of the connecting member, unless substantial external forces are applied thereto (e.g. forces of more than 100 N or at least 1 kN).

The inductive power transfer device may generally be part of a primary unit of a system for inductive power transfer. It may generally be stationary.

The power transfer part may be configured as or comprise a plate-type member or a panel. The power transfer part may, especially when configured as a plate-type member or panel, define a plane which may coincide with or extend in parallel to the plane in which the primary conductor arrangement is formed. The primary conductor arrangement may be configured to generate an alternating (electro-)magnetic field if the primary conductor arrangement is energised or supplied with an operating current, said field enabling the inductive power transfer to the vehicle.

The power transfer part may comprise a housing (e.g. at least partially formed by the optional plate-type member or panel thereof). The primary conductor arrangement may be received in and/or be surrounded by said housing. Further, the inductive power transfer device may comprise at least one connecting terminal for a power connection of the primary conductor arrangement or other electrical elements such as a converter, said connecting terminal being e.g. formed at the power transfer part.

Further, the primary conductor arrangement may comprise a plurality of phase lines, for example three phase lines. These can generally be configured to generate the aforementioned electromagnetic field for the inductive power transfer, e.g. when being fed within alternating current. At least one phase line of the primary conductor arrangement can have a meandering course. Alternatively, at least one phase line of the primary conductor arrangement can be designed such that a course of the phase line provides an even number or uneven number of sub-windings which are arranged adjacent to each other. In this context, a sub-winding denotes a, preferably complete, conductor loop, which encloses a predetermined area. The conductor loop can provide or comprise one turn or multiple turns of a respective sub-winding. Adjacent to each other means that central axes of said sub-windings, in particular the axes of symmetry, are spaced apart from one another, e.g. with a predetermined distance, along a common straight line which can e.g. correspond to a direction of extension of the primary conductor arrangement.

Further, the course of at least one phase line of the primary conductor arrangement can be 8-shaped. This means that the phase line comprises two, e.g. circular-shaped, sub-windings which are arranged adjacent to each other. Examples for forming a primary conductor arrangement out of respective phase lines can be found in GB 2512864 A. In the context of this invention, the primary conductor arrangement may be formed according to any of the examples disclosed in GB 2512864 A and any of the elements disclosed in GB 2512864 A as interacting with the primary conductor arrangement may also be compromised by the inductive power transfer device disclosed herein.

In one example, at least one or preferably all of the phase lines are held in position by means of a cable bearing element, said cable bearing element being preferably formed as a plastic mould.

The inductive power transfer device, in particular the power transfer part, may comprise at least one guiding means for guiding a magnetic flux. In particular, the power transfer device can comprise a ferrite arrangement, wherein the ferrite arrangement can e.g. comprise one or more ferrite elements, such as ferrite bars, strips or slabs. The guiding means can be used to guide a magnetic flux of the generated electromagnetic field along a desired path.

The guiding means may be formed by or comprise a magnetic layer within the inductive power transfer device and in particular the power transfer part, said layer e.g. comprising the ferrite bars of ferrite strips. The magnetic layer may further comprise a rigid plate, preferably formed of a non-magnetic metallic material such as aluminium, at which the ferrite elements are arranged. The magnetic layer may provide a stabilising function for the power transfer part and e.g. be designed with a thickness of several millimetres or even several centimetres.

The inductive power transfer device may comprise cables which can e.g. be guided towards and connected to the power transfer part. The cables may have a variable straight length (e.g. by being selectively wound onto or off a cable roller or drum). Additionally or alternatively, the cables may be provided with a defined slack or looseness in order to avoid limitations to the possible displacements of the power transfer part (e.g. in case said part is subjected to external shocks or pressures and the connecting member is deformed accordingly). The cables may be surrounded by a protective sleeve or tube, both of which are preferably flexible and/or elastic and/or watertight. Additionally or alternatively, at least sections of the cables may be guided through and thus shielded by members of the inductive power transfer device, such as hollow sections of the connecting member. The protective sleeve or tube may also be composed of different layers, where one the layer may be a shielding preferably formed of a non-magnetic metallic material such as aluminium.

The inductive power transfer device and in particular the power transfer part may comprise at least one object detection means which, at least in certain embodiments, may be referred to as an antenna. The object detection means can denote a system for detecting a foreign object, in particular a metal object, within a charging volume of the power transfer pad. Alternatively or in addition, the object detection means can be denote a system for detecting a moving object within the charging volume. The charging volume can denote a volume through which at least a predetermined portion, e.g. 80%, 90% or 95%, of the electromagnetic field generated by the primary conductor arrangement extends. The charging volume can also denote the volume through which the total electromagnetic field generated by the primary conductor arrangement extends. Also, the charging volume can denote the volume in front of the power transfer part, e.g. in front of the primary conductor arrangement. A charging surface can denote a base surface of the charging volume. In particular, the charging surface can be front surface of the power transfer part.

The at least one object detection means can comprise at least one inductive sensing system, wherein an active or passive detection can be performed by the inductive sensing system. In each case, the inductive sensing system can comprise one or multiple detection winding(s). Multiple detection windings can be arranged in an array structure wherein the array structure covers the charging surface of the power transfer part. In case of an active detection, one or more excitation winding(s) can be used. An active object detection can be performed by monitoring properties of an excitation field generated by the excitation winding(s). In the case of a passive detection, only one or more passive winding(s) are used. A passive object detection can be performed by monitoring properties of the passive winding(s), in particular an inductance. Such an inductive detection system is disclosed in GB 2508923 A or in GB 2517679 A. In the context of this invention, a detection system can be designed according to any of the embodiments as claimed in GB 2508923 A or in GB 2517679 A which are incorporated herein by reference.

In the context of this disclosure, a vertical axis may coincide with an axis of the gravitational force and may further form a normal to the horizontal spatial plane (i.e. extend orthogonally thereto), the horizontal spatial plane comprising at least one horizontal spatial axis. The horizontal spatial plane may also comprise or extend in parallel to the water surface, at least in the absence of waves. If not mentioned or evident otherwise, the terms vertical and horizontal relate to an above-mentioned vertical and horizontal axis, respectively.

The conductors (e.g. in form of phase lines) of the primary conductor arrangement may be formed in the same, adjacent or parallel spatial planes (e.g. when being stacked on top of one another), each of said plane being preferably non-horizontal. A plane in which the conductor arrangement extends may comprise at least one of these spatial planes or be defined as a median plane extending between at least two of said planes.

In general, a direction of the magnetic flux generated by the primary conductor arrangement may extend at an angle (e.g. substantially orthogonally) to the power transfer part and in particular a panel or plate-type member thereof. In one example, the direction of the magnetic flux extends substantially horizontally. Also, the direction of the magnetic flux may extend substantially orthogonally to the plane of the conductor arrangement. The direction of the magnetic flux may relate to the part of the magnetic field extending within the plane of and/or being at least partially enclosed by the primary conductor arrangement (i.e. the part which extends orthogonally through the loops or the meandering sections of the primary conductor arrangement).

The primary conductor arrangement may extend in a non-horizontal spatial plane (e.g. a vertical plane). Differently put, the loops or meandering sections of said conductor arrangement may be formed in at least one non-horizontal plane.

In general, the primary conductor arrangement and/or its single loops or meandering sections may extend substantially in parallel to a plane of the power transfer part, e.g. substantially in parallel to a front surface of the power transfer part. Said front surface may be arranged so as to face the vehicle to which the electric power is to be inductively transferred to. Differently put, a plane of the primary conductor arrangement and/or of its single loops or windings (i.e., a plane in which at least one of its loops or windings is formed), may be arranged so as to face the vehicle to which the electric power is to be inductively transferred to.

The connecting member may generally be configured to at least partially absorb shocks and/or pressures exerted onto the power transfer device, e.g. by being resiliently deformed accordingly. Specifically, said shocks and/or pressures may be exerted onto the power transfer part, e.g. when arranging the vehicle close thereto during or in preparation of the inductive power transfer. For doing so, the connecting member may be a fender.

The at least one resilient portion of the connecting member (or the connecting member as such) may be formed of an elastic and/or a plastic or rubber material (e.g. vulcanised rubber). The connecting member or at least its resilient portion may be designed as a hollow member in order to improve resiliency. The resilient portion may form a central portion of the connecting member and/or be positioned between the connecting portions. Generally, displacements of the power transfer part may only be possible if deforming the connecting member or at least the resilient portion thereof.

The first and/or second connecting portion may each be provided by a separate member attached to a central portion and in particular to the resilient portion of the connecting member. In one example, the first and/or second connecting portion comprise a ring-type member or section of the connecting member. Additionally or alternatively, the first and/or second connecting portion may at least partially be formed of a rigid material, in order to allow for a reliably fastening to the respective members connected thereto. The respective connections may be formed with help of fastening means, such as bolts. At least the second connecting portion may also be configured as a closed surface (i.e. front surface) of the connecting member, said surface e.g. having a circular or rectangular shape. The first and/or second connecting portion may also be configured as an elongated portion or member (e.g. an elongated rectangular member).

The term "connecting" as used herein may, unless stated or evident otherwise, encompass both of a direct connection (e.g. a direct fastening to one a further member including a contact to said member) and an indirect connection (e.g. an indirect fastening to one a further member without a contact and via further intermediate members).

As detailed below, the surroundings may be formed by a mooring area end in particular a specific fastening region thereof, such as a vertical portion facing e.g. a side portion of the vehicle.

According to a further embodiment, the power transfer part extends in a plane that is substantially parallel to the first connecting portion. For example, the first connecting portion may define a connecting face or contact face, which may be coupled with (e.g. may abut to) the surroundings or the power transfer part. This face may extend in or define a plane which is substantially parallel to the power transfer part (e.g. parallel to a plate-type member or panel thereof). Such a configuration may help to limit the size of the overall device and improve the distribution of forces therein in response to external shocks (e.g. the forces thus running substantially straight and preferably with a shortest possible distance through the device).

In one example, the connecting member comprises at least one section with an oval or circular cross-section. Said cross-section may extend orthogonally to a longitudinal axis of the connecting member, said longitudinal axis generally extending along a length-dimension of the connecting member and/or along the longest dimension of the connecting member. Moreover, the longitudinal axis may extend orthogonally to at least one of the surroundings, the power transfer part or at least one of the connecting portions. By providing a respectively shaped cross-section the deformability of the connecting member may be defined in a particularly reliable manner and undesired stresses therein may be limited. Alternatively, the connecting member may have a substantially triangular or rectangular cross-section.

According to a further embodiment, the connecting member comprises at least one conical or cylindrical section. Said section may form the discussed resilient portion. According to another example, the resilient portion may comprise a plurality of respective conical or cylindrical sections. Additionally or alternatively, the conical or cylindrical section may provide the above-discussed section having the oval or circular cross-section. As a further alternative, the connecting member may comprise at least one triangular or rectangular section.

As noted above, the connecting member may have a defined longitudinal axis. In one example, said longitudinal axis extends according to one of the following:
the longitudinal axis extends substantially in parallel to the power transfer part (and/or the fastening region); or
the longitudinal axis extends at an angle to the power transfer part (and/or the fastening region).

The first alternative may allow for a particularly small size of the power transfer device, in particular with respect to its horizontal dimensions. In this case, the connecting member may be provided as an elongated member extending along the surroundings, such as a fastening region. The second alternative, on the other hand, may help to provide a particularly strong design that may compensate for high external forces and pressures. In this case, the connecting member may be provided as a member extending e.g. substantially orthogonally to the surroundings, such as a fastening region.

According to a further embodiment, at least one outer face of the power transfer part comprises at least one region with a protective layer, said layer e.g. comprising at least one of a resin, plastic or rubber material. The outer face may be a front face or front surface which faces a vehicle to which the power is to be transferred to. In one example, all outer faces (preferably including any edge portions) may be provided with a respective protective layer. In this context, however, recesses or through holes may be provided in said protective layer e.g. for connecting the connecting portion or cables to the power transfer part.

The power transfer device may further comprise a cable arrangement that is connected to the power transfer part, wherein the cable arrangement is flexible, so as to compensate for displacements of the power transfer part. The cable arrangement may include at least one cable and preferably a plurality of single phase lines (e.g. three phase lines). The cable arrangement may connect on its one end to a stationary unit which may e.g. comprise power electronics and/or be mounted to a mooring area. On its other end, the cable arrangement may connect to the power transfer part. This is preferably done at a location remote from the front surface facing the vehicle (e.g. at a backside or opposite surface of the power transfer part). The cable arrangement may be arranged in a protective sleeve or tube which may be flexible and/or elastic. In one example, the cable arrangement is provided with a certain predefined looseness or slack may have a variable straight length e.g. by being wound off of a drum or roller.

Any of the above measures may help to compensate for displacements of the power transfer part, e.g. by adjusting a respective straight length of the cable arrangement and/or by straightening previously loose or slack portions thereof.

The invention further relates to a mooring area, comprising a fastening region (e.g. a wall or plane) extending at an angle to an adjacent water surface and comprising a power transfer device according to any of the preceding or subsequent aspects that is arranged at said fastening region.

The mooring area may e.g. be provided as or by a quay, a wharf, a staith, a jetty, a bank area, a shore area or a landing stage. It may generally relate to an artificially created structure at a riverbank, lake- or sea-shore or within a port or harbour. Also, it may generally allow for water-bound vehicles to moore or berth thereat and preferably to be tied-up thereto. In general, the mooring area may be formed of or comprise a rigid material, such as stone, bricks, wood or concrete. The fastening region may extend substantially orthogonally to the water surface and/or may extend vertically in space. Alternatively put, the fastening region may define a plane which extends substantially vertically. The mooring area may also comprise a further portion (e.g. a further wall or floor) which may be at an angle to the above-mentioned fastening region. Said further portion may, for example, extend substantially horizontally and allow for goods or people to be positioned close to the water.

In this context, a longitudinal axis of the connecting member may extend according to one of the following:
the longitudinal axis extends substantially in parallel to the fastening region; or
the longitudinal axis extends at an angle to the fastening region.

As noted above with respect to a relative arrangement of the longitudinal axis and the power transfer part (which may generally extend in parallel to the fastening region), the first variant may help to limit the size where is the second variant may help to improve strength and rigidity.

In the following, an embodiment of the invention will be described with reference to the attached schematic figures. Features which correspond to one another with regard to their type and/or function may be assigned the same reference signs throughout the figures. In the figures.

Figure 1:
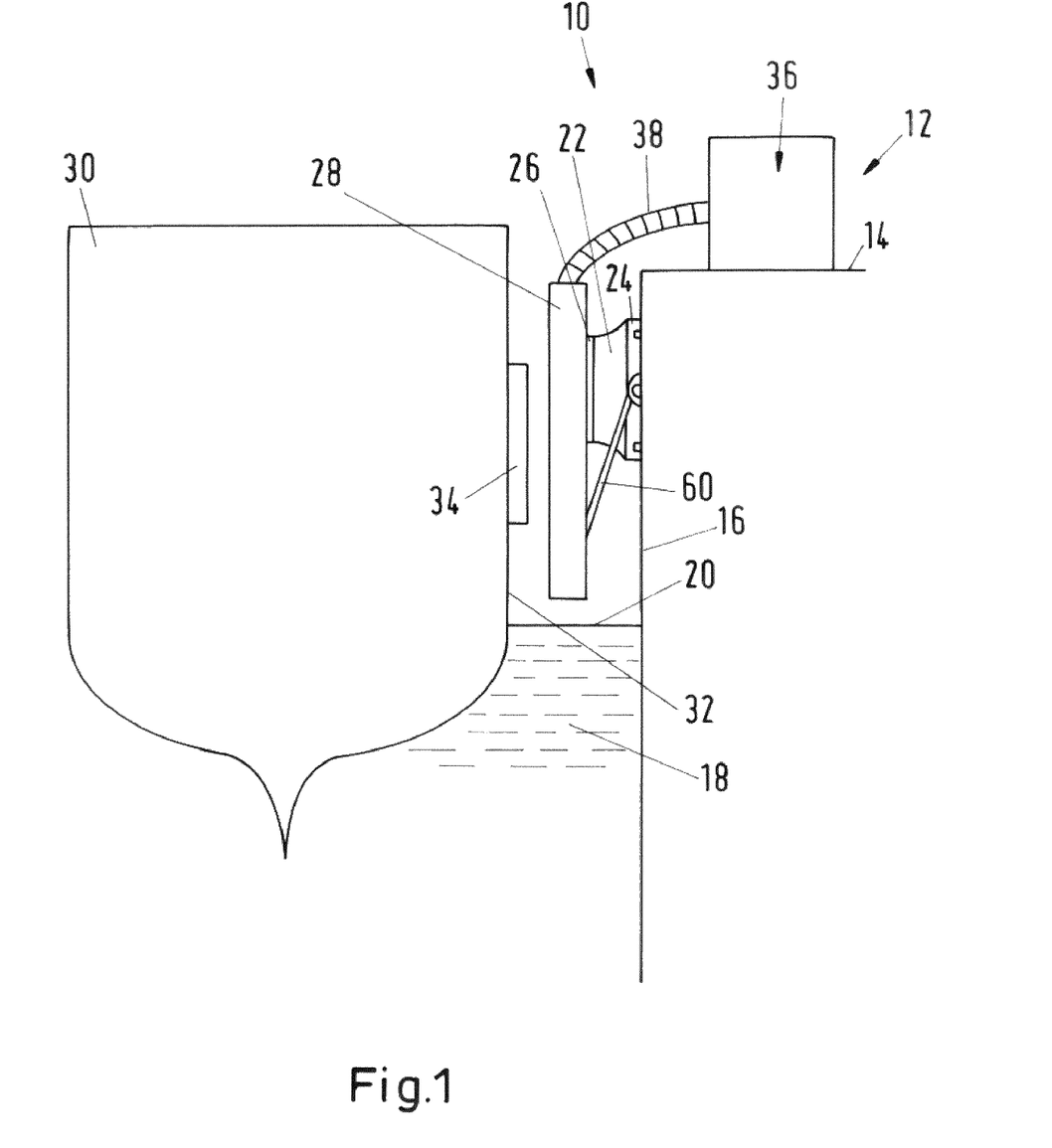
FIG. 1 shows a side view of a mooring area comprising a power transfer device according to an embodiment of the invention.

In FIG. 1, a power transfer device 10 according to the invention is shown. The power transfer device 10 is arranged at a mooring area 12, said mooring area comprising a horizontal top surface or, differently put, horizontal floor 14. Moreover, the mooring area 12 comprises a fastening region in form of a vertical wall 16 which is partially submerged into a body of water 18. In the given example, the mooring area is provided as a quay.

To said vertical wall 16 and at a position above the water level (or water surface) 20, a connecting member 22 is fixed. For doing so, the connecting member 22 comprises a first connecting portion 24 which contacts and is fastened to the vertical wall 16. Moreover, the connecting member 22 comprises a second connecting portion 26 which contacts and is fastened to a backside of a power transfer part 28. As will be further detailed below, the connecting member 22 is a resilient and elastically deformable fender.

Figure 2:
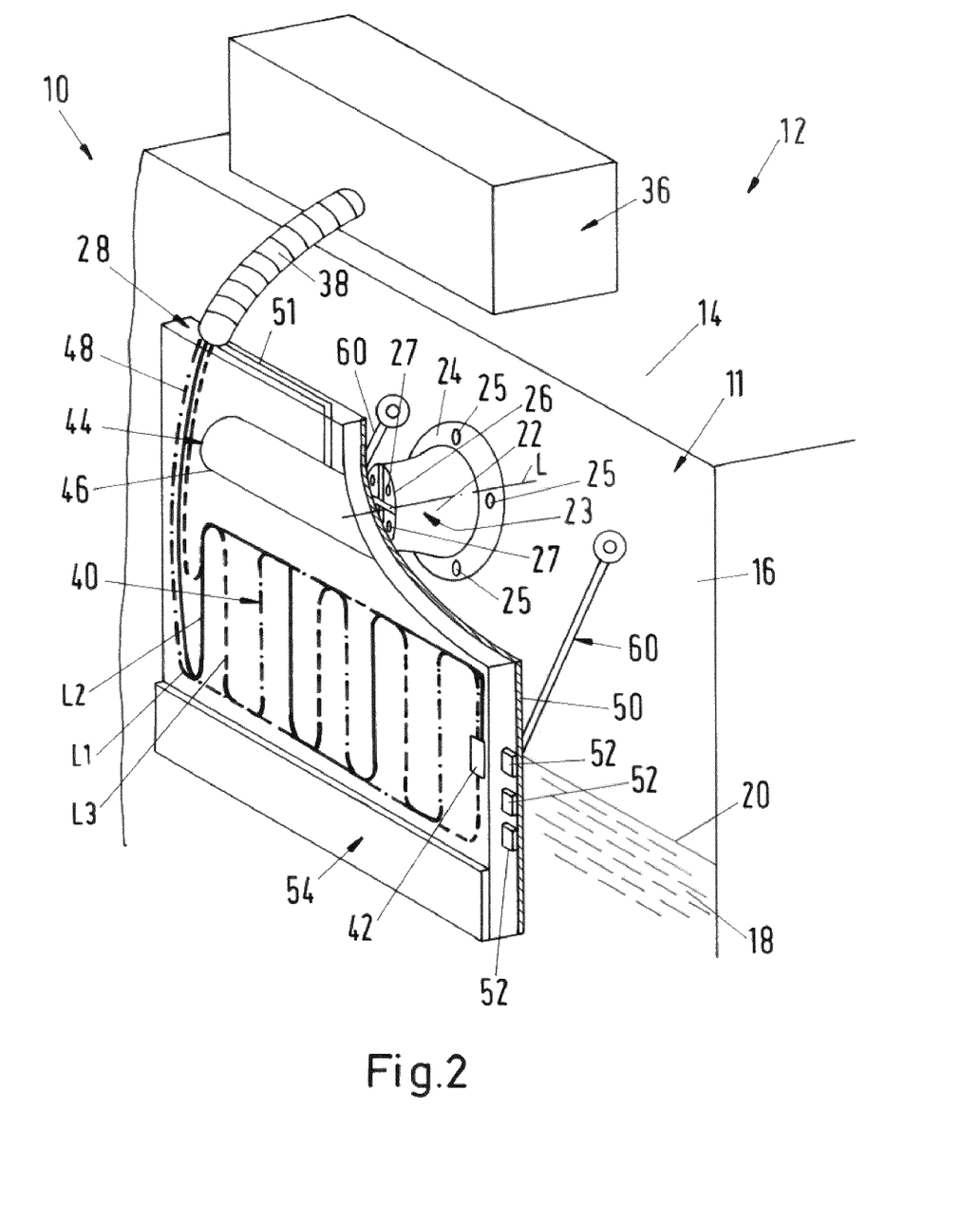
FIG. 2 shows a perspective view of the power transfer device of FIG. 1.

As will be further detailed with respect to FIG. 2, the power transfer part 28 comprises a primary conductor arrangement 40 which, when energised, is configured to generate an alternating electromagnetic field for inductively transferring electric power to a vehicle 30. In the shown example, the vehicle 30 is a ship which floats on the water 18 in which is schematically illustrated by way of a partial cross section thereof. A front portion of the vehicle 30 (not shown) faces the viewer in FIG. 1. On the other hand, a sidewall 32 of the vehicle 30 faces a front surface of the power transfer part 28. At said sidewall 32, a secondary conductor arrangement in the form of a pick-up arrangement 34 is arranged, said pick-up arrangement 34 being configured to receive the electromagnetic field and to inductively generate electrical energy therefrom which may be fed to an electrical energy storage of the vehicle 30. The vehicle is thus shown in a side berthing position but the invention is not limited thereto (e.g. end berthing is equally possible).

FIG. 1 further shows the power electronics 36 for feeding electrical energy to the power transfer part 28. The power electronics 36 may e.g. comprise a primary converter. The power electronics 36 are arranged at the horizontal floor 14 of the mooring area 12 and are generally stationary. Also, the power electronics 36 are connected to the power transfer part 28 by way of a cable arrangement 38 which is surrounded by a flexible tube and generally provided with a defined slack (i.e. not tensioned, at least when no external forces are applied to the power transfer part 28).

In the following, FIG. 2 is referred to for discussing the power transfer device 10 in further detail. FIG. 2 shows a perspective view from which the arrangement of the connecting member 22 at the vertical portion 16 again becomes evident. The same applies to the arrangement of the power electronics 36 at the horizontal mooring area floor 14. Moreover, it can be seen that the connecting member 22 comprises a cylindrical central portion 23 having a circular cross-section and connecting the connecting portions 24, 26 to one another (i.e. the connecting portions 24, 26 being formed at opposite ends of the central portion 23). A longitudinal axis L of the connecting member 22 which extends orthogonally to a plane of its cross-section and marks a length dimension of the connecting member 22 extends orthogonally to the vertical portion 16. The connecting member 22 or at least its central portion 23 may comprise or consist of an elastic material, such as vulcanised rubber and may be configured as a hollow member.

In addition, it can be seen that the first connecting portion 24 is configured as a ring-shaped member comprising through holes 25 for receiving non-depicted bolts in order to fasten the connecting member 22 to the vertical wall 16. The second connecting portion 26 which is partially visible in the illustration of FIG. 2 is generally configured as a front surface of the connecting member 22 and also comprises through holes 27 for coupling the power transfer part 28 thereto. Both of the first and second connecting portion 24, 26 may comprise rigid (e.g. metallic) materials, such as a rigid ring or a rigid plate. These may be moulded into the elastic material of the connecting member 22 and/or connected to of the central cylindrical portion 23 by other means (e.g. mechanical means).

Accordingly, the connecting member 22 is generally resilient and, in particular, compressible, e.g. when shocks or pressures are applied to the power transfer part 28. The latter may occur when trying to position the vehicle 30 adjacent to and contacting the power transfer part 28.

In the following, the power transfer part 28 will be described in further detail. In FIG. 2, said power transfer part 28 is displayed in a partially cutaway view in order to show the details of the connecting member 22. Specifically, the upper right corner of the power transfer part 28 is cutaway for illustrative purposes only. That is, the power transfer part 28 is generally configured as a solid rectangular member (i.e. as a panel or a plate-type member) without a respective cutaway or rounded corner. Moreover, the power transfer part 28 is shown in a partially transparent manner in order to explain some of its interior components. These are not actually exposed to the environment but housed within and covered by the power transfer part 28. When viewing FIGS. 1 and 2 in conjunction, it is further evident that the plate-type power transfer part 28 generally extends parallel to the vertical wall 16 and thus in a non-horizontal manner but in a vertical spatial plane. Additionally, the power transfer part 28 extends parallel to the first and second connecting portions 26, 24.

This also relates to a primary conductor arrangement 40. The primary conductor arrangement 40 comprises three individual phase lines, namely a first phase line L1, a second phase line L2 and a third phase line L3. These each extend in horizontal directions (i.e. in parallel to the vertical wall 16) in a meandering manner and are connected to one another at a star point 42. Accordingly, each phase line L1, L2, L3 comprises horizontal as well as vertical sections. Moreover, each phase line L1, L2, L3 is connected to and provided with an individual phase current, wherein a distance between the phase line L1, L2, L3 and in particular between vertical sections thereof is chosen so that a phase difference of 120° between the individual phase currents is achieved. Further details on such a design of a primary conductor arrangement 54 can be found in GB 2512864 A, in particular in connection with FIG. 2.

It is evident from FIG. 1, that the primary conductor arrangement 54 and in particular each phase line L1, L2, L3 which forms meandering sections thereof, extends within the plane of the panel-type power transfer part 12. Accordingly, the primary conductor arrangement 54 generally extends and/or is generally formed in a non-horizontal spatial plane and extends substantially vertically. Moreover, the main direction of a magnetic flux produced by the primary conductor arrangement 54 in the area of said primary conductor arrangement 54 extends substantially orthogonally to the plane of the primary conductor arrangement 54 and of the power transfer part 12, i.e. substantially horizontally (for example ca. at an 45°-angle in FIG. 2 with respect to the front surface of the power transfer part 28 and towards the viewer). In addition, a normal to the plane defined by the phase lines L1, L2, L3 is a horizontal axis, which again may extend ca. at an 45°-angle in FIG. 2 with respect to a front surface of the power transfer part 28. Accordingly, the conductors L1, L2, L3 of the conductor arrangement 54 generally extend in and describe a defined course (i.e. a meandering course) in a non-horizontal spatial plane. That is, a longitudinal axis of each conductor L1, L2, L3 which extends along and defines a length-dimension of the conductors L1, L2, L3 runs in a non-horizontal spatial plane. Overall, the conductor arrangement 54 is thus arranged and extends in a non-horizontal plane.

As a further (interior) component of the power transfer part 12, an object detection means 44 in the form of an antenna is shown. The object detection means 44 comprises a single detection winding 46 which is partially cutaway in FIG. 2 but generally configured as an oval and closed winding. The object detection means 44 acts as a passive inductive sensor for detecting the presence of an object, such as a (metallic) part of the vehicle 30 to which power is to be transferred to.

From FIG. 2, it is further evident that both of the primary conductor arrangement 40 as well as the object detection means 44 are connected to the power electronics 36 by way of individual cable sections 48, 51 of the cable arrangement 38. Specifically, the cable sections 48, 51 within the power transfer part 28 and into the externally exposed flexible tube-section of the cable arrangement 38 which is connected to the power electronics 36.

Generally, the power transfer part 28 is designed to be sufficiently rigid in order to absorb shocks and/or pressures applied thereto by the vehicle 30. For doing so, the power transfer part 28 comprises a aluminium back plate 50 which acts as a guiding means for the magnetic flux by comprising numerous ferrite bars 52 of which only some sections are visible in FIG. 2.

In addition, at least a front surface of the power transfer part 28 facing the viewer in FIG. 2 is covered by a protective layer 54 made of e.g. resin or rubber. The protective layer 54 may only be formed in a specific region of the power transfer part, e.g. by spanning across a lower region of the power transfer part 28 as shown in FIG. 2. This way, interferences with the inductive power transfer may be limited. Alternatively, the protective layer 24 may cover the whole of the front surface of the power transfer part 28 in order to improve the protection.

Finally, in FIGS. 1 and 2, support chains 60 are shown which, for illustrative purposes only, are depicted as rod-like members but generally configured as elongated chains comprising a succession of chain links. The chains 60 are from of a non-metallic material in order to avoid interferences with the generated electromagnetic field. Moreover, the chains 60 are tensioned so as to hold the power transfer part 28 in place and pull it close to and against the connecting member 22 with a defined force.

From the above discussion, it becomes evident that the power transfer device 10 does not comprise a specific kinematic unit comprising e.g. defined axes or joints, let alone any actuators which would allow for defined, actuatable or controllable movement of the power transfer part 28. Instead, the power transfer part 10 is generally configured as a passive system for positioning the power transfer part 28 in space and coupling it to the mooring area 12. The power transfer device 10 is thus configured as a cheap and reliable system of low complexity.

In order to achieve an inductive power transfer, the vehicle 30 of FIG. 1 can be maneuvered in such a manner, that its pick-up arrangement 34 is arranged oppositely to the power transfer part 28 (e.g. substantially congruent and/or at a desired distance thereto). Afterwards, the vehicle 30 may e.g. be anchored at or tied up to the mooring area 12. It could also be considered that the vehicle 30 comprises a kinematic unit (e.g. a movable arm) for positioning the pick-up arrangement 34 relative to the power transfer part 28. This may be done after the anchoring or tying up and/or may be limited to horizontal movements.

Moreover, the connecting member 22 generally acts a resilient and, more specifically, elastically deformable member in order to compensate for external shocks or pressures applied to the power transfer part 28. For example, the connecting member 22 may be compressed (but generally also elongated) in response to such forces being applied to the power transfer part 28. This way, internal stresses may be limited and the overall device 10 is rendered more reliable (e.g. compared to a fully rigid system).

Furthermore, from the perspective of an operator of the vehicle 30, the power transfer is generally easier to achieve. This is because due to the resilient connecting member 22, there exists defined tolerances for positioning the vehicle 30 and pickup arrangement 34 relative to the power transfer part 28. Specifically, when approaching the power transfer part 28 with a vehicle 30, it may be acceptable if the vehicle 30 comes in contact with the power transfer part 28, since forces that may be exerted onto the power transfer 28 in this context can be compensated for by means of the resilient connecting member 22. Thus, it is not necessary to manoeuvre the vehicle 30 with a very high precision when preparing for desired the power transfer.

Figure 3:
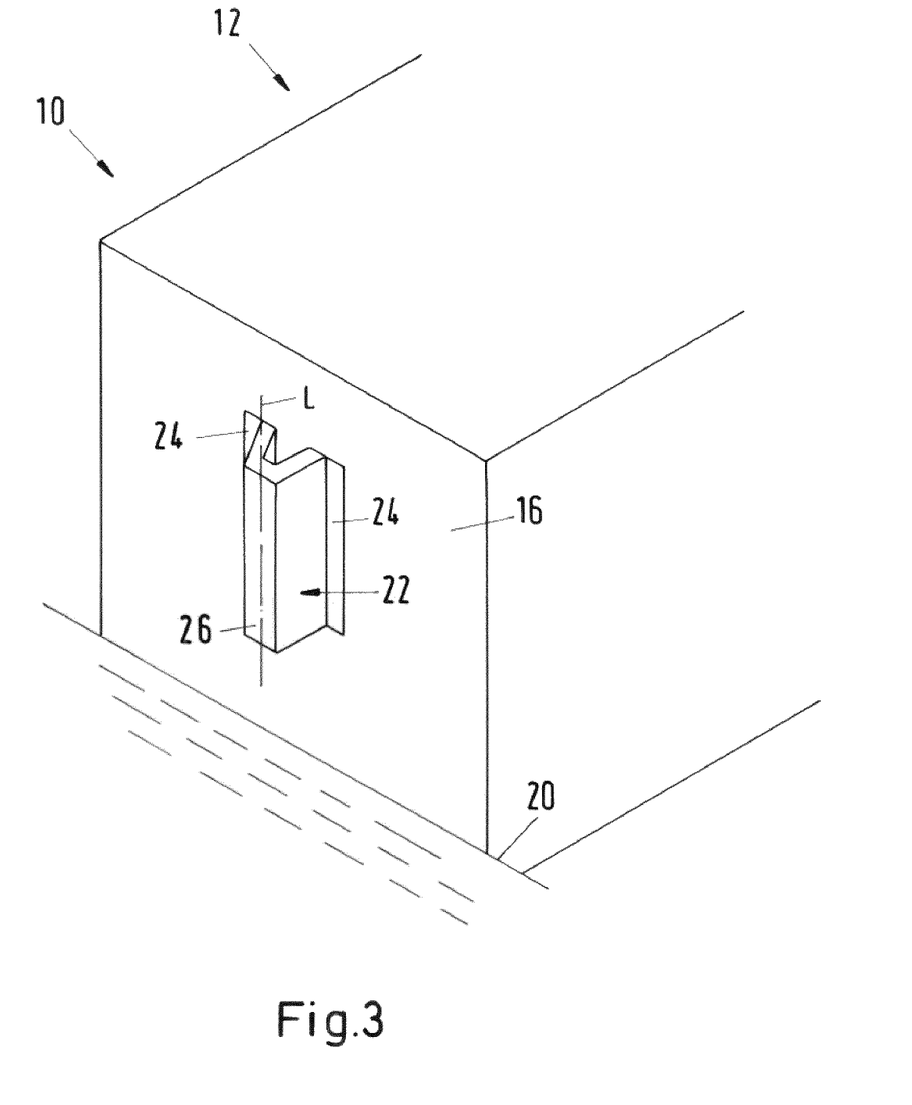
FIG. 3 shows a perspective view of a power transfer device according to a further embodiment of the invention.

FIG. 3 shows a further embodiment of a power transfer device 10 according to the invention. In this figure, only the connecting member 22 is shown which, again, is connected wall 16 of a mooring area 12 in a position above the water level 20. The non-depicted power transfer part 28 as well as the cable arrangement 38, the power electronics 36 and the chains 60 are configured similarly to the previous example and are thus not specifically depicted and discussed. The connecting member 22 is again provided as a resilient and elastically deformable fender.

The longitudinal axis L of the connecting member 22, which extends along a longest dimension of the connecting member 22, extends in parallel to the vertical wall 16 as well as vertically (horizontally would equally be possible when rotating the connecting member 22 by 90°). Moreover, the connecting member 22 has a substantially triangular cross-section extending orthogonally to the longitudinal axis L. At its outer edges, the connecting member 22 has elongated first connecting portions 24 extending along the longitudinal axis L and comprising non-depicted through holes for receiving fastening bolts. The second connecting portion 26 is again configured as a front surface of the connecting member 22 and has a rectangular elongated shape extending along the longitudinal axis L.

The connecting member 22 is formed of any resilient and, more specifically, elastically deformable material. External shocks and pressures applied to the non-depicted power transfer part 28 may thus be compensated for by compressing and deforming the connecting member 22. The embodiment of FIG. 3 is marked by a limited size and in particular limited horizontal dimensions, thus further improving compactness of the power transfer device 10.

Note that in both embodiments, a different number of similarly shaped connecting members 22 could be provided e.g. two or three.

The invention claimed is:

1. A power transfer device for inductively charging a water-bound vehicle, the power transfer device comprising:
   a power transfer part comprising a primary conductor arrangement; and
   at least one connecting member which has at least one first connecting portion for connecting the power transfer device to surroundings and at least one second connecting portion for connecting the connecting member to the power transfer part;
   wherein the connecting member comprises a fender that includes at least one resilient portion that is configured to absorb shocks exerted onto the power transfer part.

2. The power transfer device according to claim 1, wherein the power transfer part extends in a plane that is substantially parallel to the first connecting portion.

3. The power transfer device according to claim 1, wherein the power transfer part is formed as a plate- or panel-type member.

4. The power transfer device according to claim 1, wherein the connecting member comprises at least one section with an oval a circular cross-section.

5. The power transfer device according to claim 1, wherein the connecting member comprises at least one conical or cylindrical section.

6. The power transfer device according to claim 1, wherein a longitudinal axis (L) of the connecting member extends according to either of the following:
- the longitudinal axis (L) extends substantially in parallel to the power transfer part; or
- the longitudinal axis (L) extends at an angle to the power transfer part.

7. The power transfer device according to claim 1, wherein at least one outer face of the power transfer part comprises at least one region with a protective layer.

8. The power transfer device according to claim 7, wherein the protective layer comprises at least one of a resin, plastic or rubber material.

9. The power transfer device according to claim 1, comprising a cable arrangement that is connected to the power transfer part, wherein the cable arrangement is flexible, so as to compensate for displacements of the power transfer part.

10. A mooring area, comprising a fastening region extending at an angle to an adjacent water surface and comprising a power transfer device according to claim 1 that is fastened to said fastening region.

11. The mooring area according to claim 10, wherein a longitudinal axis (L) of the connecting member extends according to one of the following:
- the longitudinal axis (L) extends substantially in parallel to the fastening region; or
- the longitudinal axis (L) extends at an angle to the fastening region.

* * * * *